US012724552B2

(12) United States Patent
Lee et al.

(10) Patent No.: US 12,724,552 B2
(45) **Date of Patent: *Sep. 1, 2026**

(54) METHOD FOR OPERATING MEMORY DEVICE

(71) Applicant: SAMSUNG ELECTRONICS CO., LTD., Suwon-si (KR)

(72) Inventors: Kyungduk Lee, Suwon-si (KR); Youn-Soo Cheon, Suwon-si (KR); Daehyeon Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/029,632

(22) Filed: Jan. 17, 2025

(65) Prior Publication Data

US 2025/0165164 A1 May 22, 2025

Related U.S. Application Data

(63) Continuation of application No. 18/101,232, filed on Jan. 25, 2023, now Pat. No. 12,229,418.

(30) Foreign Application Priority Data

Jun. 9, 2022 (KR) ........................ 10-2022-0070226

(51) Int. Cl.
*G06F 12/00* (2006.01)
*G06F 3/06* (2006.01)

(52) U.S. Cl.
CPC .......... *G06F 3/0625* (2013.01); *G06F 3/0634* (2013.01); *G06F 3/0659* (2013.01); *G06F 3/0673* (2013.01)

(58) Field of Classification Search
CPC .... G06F 3/0634; G06F 3/0659; G06F 3/0673; G06F 3/061; G06F 3/068; G06F 3/0679; G06F 3/0617; G06F 9/4401; G06F 12/0246; G11C 16/26; G11C 16/10
See application file for complete search history.

(56) References Cited

U.S. PATENT DOCUMENTS

| | | | | |
|---|---|---|---|---|
| 7,259,989 | B2 | 8/2007 | Toyama et al. | |
| 9,196,371 | B2 | 11/2015 | Yamano et al. | |
| 10,325,633 | B2 | 6/2019 | Lee et al. | |
| 10,403,375 | B2 | 9/2019 | Lee et al. | |
| 10,949,305 | B2 | 3/2021 | Lee | |
| 10,976,933 | B2 | 4/2021 | Lee et al. | |
| 11,056,200 | B2 | 7/2021 | Shin et al. | |
| 11,194,513 | B2 | 12/2021 | Seong | |
| 2011/0099325 | A1 | 4/2011 | Roh et al. | |
| 2016/0154594 | A1 | 6/2016 | Kang | |
| 2021/0026738 | A1 | 1/2021 | Lin | |
| 2021/0034295 | A1* | 2/2021 | Shin | G06F 3/0656 |
| 2021/0271603 | A1 | 9/2021 | Um | |

OTHER PUBLICATIONS

U.S. Appl. No. 18/101,232, filed Jan. 25, 2023.

* cited by examiner

*Primary Examiner* — Arvind Talukdar
(74) *Attorney, Agent, or Firm* — Sughrue Mion, PLLC

(57) ABSTRACT

Provided is a method for operating a memory device including performing a first setting operation on a first operation, reading map data based on the first setting operation, and performing a second setting operation on a second operation.

20 Claims, 13 Drawing Sheets

5

BLK1

METHOD FOR OPERATING MEMORY DEVICE

CROSS-REFERENCE TO RELATED APPLICATION

This present application is a continuation of U.S. application Ser. No. 18/101,232 filed Jan. 25, 2023, which claims priority to Korean Patent Application No. 10-2022-0070226 filed in the Korean Intellectual Property Office on Jun. 9, 2022, the entire contents of which are incorporated herein by reference in their entirety.

BACKGROUND

Field

Embodiments of the present disclosure relate to a method for operating a memory device.

Description of Related Art

A memory system programs data and reads the data if needed, and it may include a memory device to which the data are programmed and a memory controller for controlling a general operation of the memory device. The memory device may include a non-volatile memory (NVM) of which stored data are not extinct when no power voltage is supplied, and a volatile memory (VM) of which stored data are extinct when no power voltage is supplied.

Recently, the memory device may achieve the purpose of high density and large capacity according to researches for increasing integration of the memory device, and simultaneously, times for initializing and setting operations of the memory device are also increasing.

SUMMARY

One or more embodiments may provide a memory system for reducing a booting time.

One or more embodiments may also provide a memory system for reducing power consumption at a time of booting.

One or more embodiments may also provide a memory system for improving a booting time in a power management mode.

According to an aspect of an embodiment, there is provided a method for operating a memory device including performing a first setting operation on a first operation, reading map data based on the first setting operation, and performing a second setting operation on a second operation.

According to another aspect of an embodiment, there is provided a method for operating a memory device including receiving a command in a power management mode, determining a type of the command, performing a first setting operation on a first operation based on the type of the command, reading map data, and processing a request based on the command by using the map data.

According to another aspect of an embodiment, there is provided a memory system including a memory device, and a memory processor configured to determine a region in which map data are stored in the memory device, performing a first setting operation on the region in which the map data are stored, reading the map data based on the first setting operation, and performing a second setting operation on a region in which the map data are not stored in the memory device . . .

BRIEF DESCRIPTION OF THE DRAWINGS

The above and other objects and features of the present disclosure will become apparent by describing in detail embodiments thereof with reference to the accompanying drawings, in which.

DETAILED DESCRIPTION OF THE EMBODIMENTS

Figure 1:
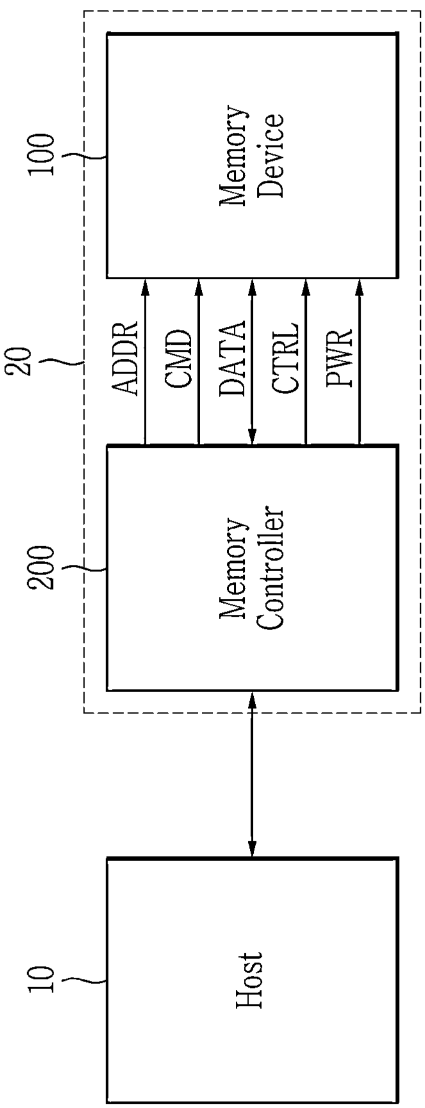
FIG. 1 shows a block diagram on a computing system according to an embodiment.

In the following detailed description, embodiments of the have been shown and described, simply by way of illustration. As those skilled in the art would realize, the described embodiments may be modified in various different ways, all without departing from the spirit or scope of the present disclosure. Embodiments described herein are example embodiments, and thus, the disclosure is not limited thereto.

Accordingly, the drawings and description are to be regarded as illustrative in nature and not restrictive, and like reference numerals designate like elements throughout the specification. In the flowcharts described with reference to the drawings, the operation order may be changed, various operations may be merged, certain operations may be divided, and certain operations may not be performed.

An expression recited in the singular may be construed as singular or plural unless the expression "one", "single", etc., is used. Terms including ordinal numbers such as first, second, and the like, will be used only to describe various components, and are not to be interpreted as limiting these components. The terms may be only used to differentiate one component from others.

Figure 2:
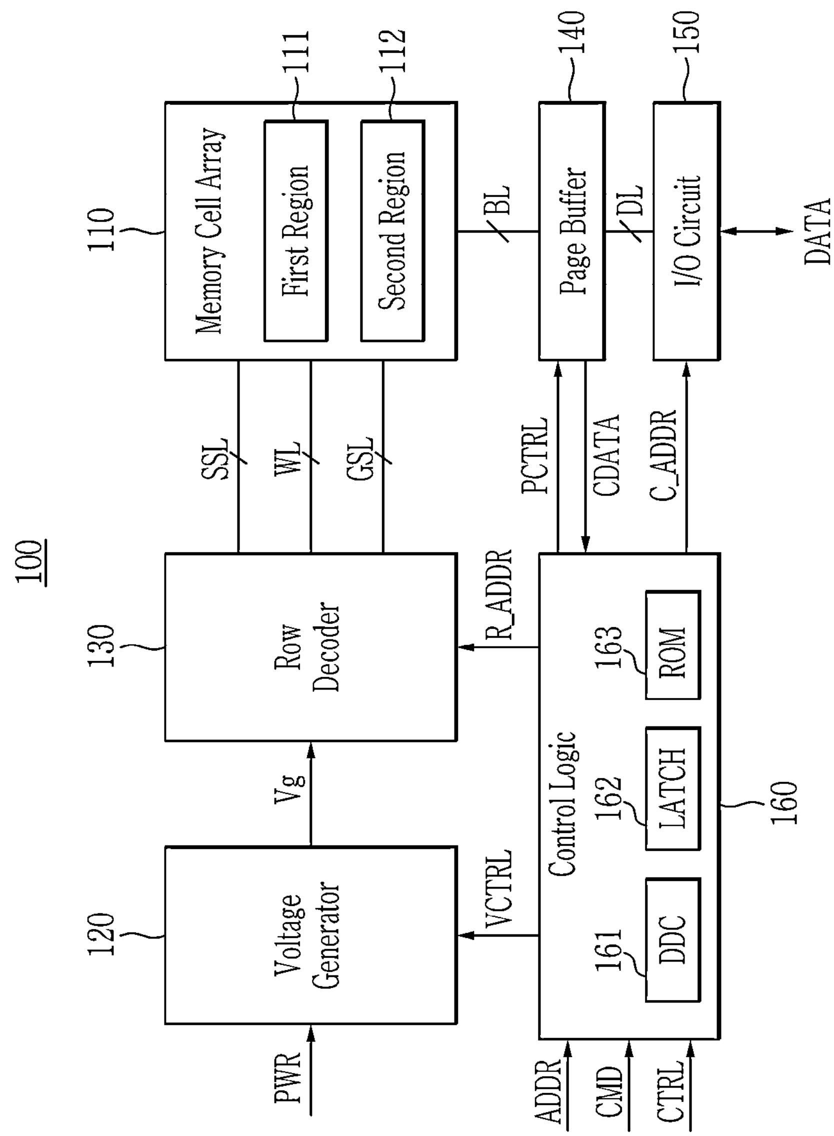
FIG. 2 shows a block diagram on a memory device shown in FIG. 1.
Figure 3:
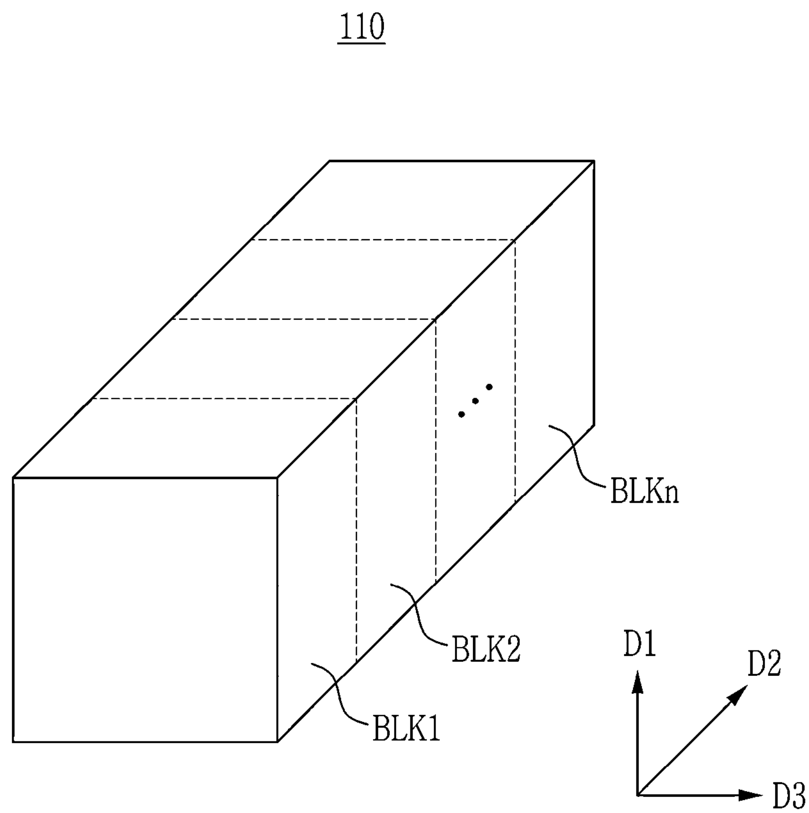
FIG. 3 shows a memory cell array shown in FIG. 2.
Figure 4:
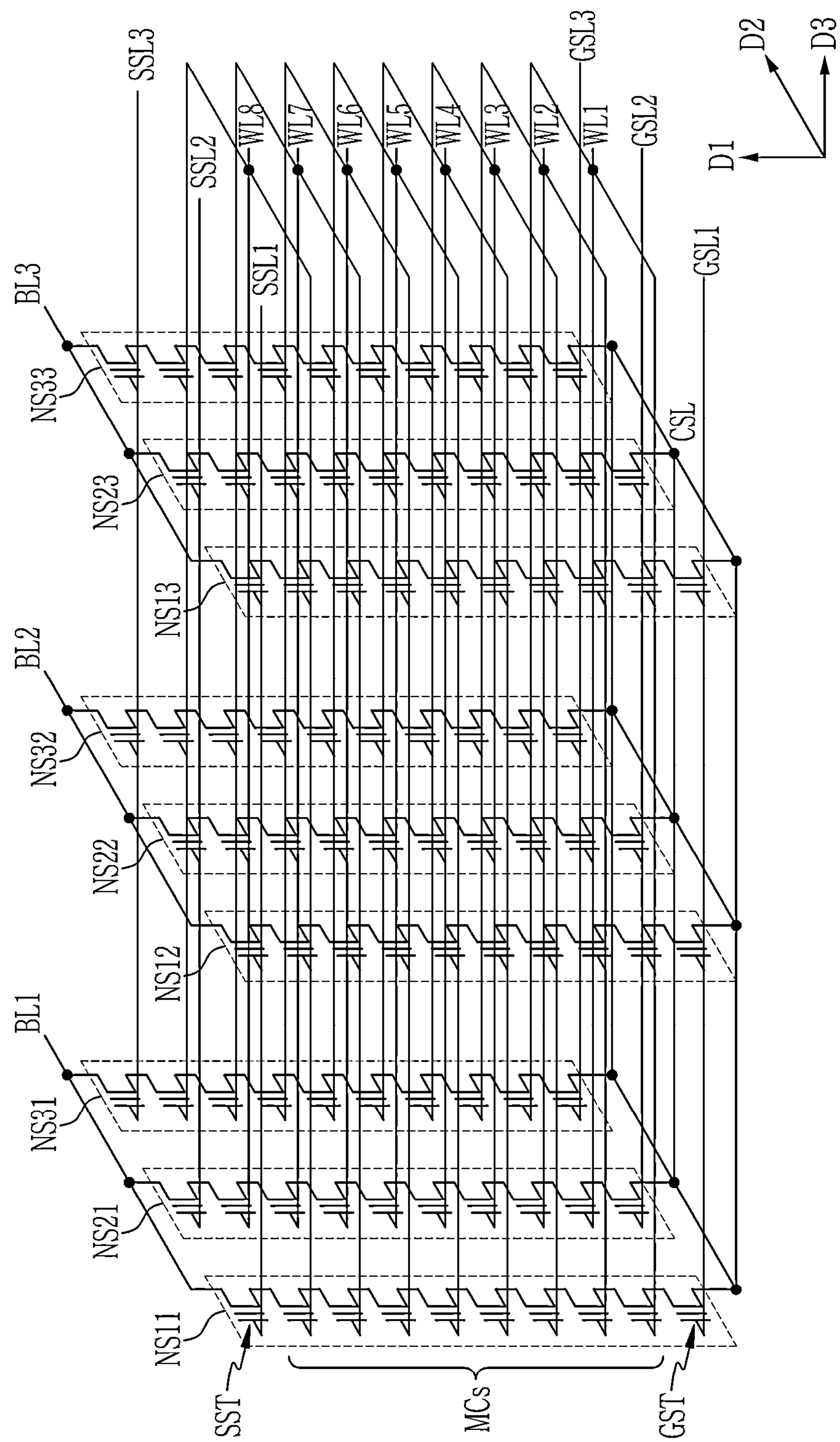
FIG. 4 shows a circuit diagram on an equivalent circuit of a first memory block shown in FIG. 3.

FIG. 1 shows a block diagram on a computing system according to an embodiment, FIG. 2 shows a block diagram on a memory device shown in FIG. 1, FIG. 3 shows a memory cell array shown in FIG. 2, and FIG. 4 shows a circuit diagram on an equivalent circuit of a first memory block shown in FIG. 3.

Referring to FIG. 1, the computing system 5 may include a host 10 and a memory system 20. The host 10 may communicate with the memory system 20 through various types of interfaces. The host 10 may request data processing operations from the memory system 20, for example, a data read operation, a data write (or program) operation, and a data erase operation. For example, the host 10 may be a central processing unit (CPU), a graphics processing unit (GPU), a microprocessor, or an application processor (AP).

The computing system 5 may be implemented as a personal computer (PC), a data server, a laptop computer, or a portable device. The portable device may be implemented as a mobile phone, a smartphone, a tablet PC, a personal digital assistant (PDA), an enterprise digital assistant (EDA), a digital still camera, a digital video camera, a portable multimedia player (PMP), a personal navigation device or a portable navigation device (PND), a handheld game console, or an e-book. The computing system 5 may also be implemented as a system on chip (SoC).

The memory system 20 may include a memory device 100 and a memory controller 200. The memory system 20 may be implemented as various types of storage devices such as solid-state drive (SSD), an embedded multimedia card (eMMC), a universal flash storage (UFS), a compact flash (CF), a secure digital (SD), a micro secure digital (micro SD), a mini secure digital (mini-SD), an extreme digital (xD), or a memory stick.

The memory controller 200 may access the memory device 100 in response to the request from the host 10. The memory controller 200 may be configured to provide an interface between the memory device 100 and the host 10. The memory controller 200 may be configured to drive firmware for controlling the memory device 100.

The memory controller 200 may control an operation of the memory device 100. In detail, the memory controller 200 may provide at least one of an address ADDR, a command CMD, a data DATA, a control signal CTRL, and a power PWR through an input and output line connected to the memory device 100.

The memory controller 200 may use at least one of the address ADDR, the command CMD, the control signal CTRL, and the power PWR, may program or erase data to/from the memory device 100, or may read data from the memory device 100. The control signal CTRL may include a chip enable CE, a write enable WE, and a read enable RE.

The memory device 100 may be a non-volatile memory device such as a NAND flash memory, a vertical NAND flash memory (VNAND), a NOR flash memory, a resistive random access memory (RRAM), a phase-change memory (PRAM), a magneto resistive random access memory (MRAM), a ferroelectric random access memory (FRAM), or a spin transfer torque random access memory (STT-RAM).

Referring to FIG. 2, the memory device 100 may include a memory cell array 110, a voltage generator 120, a row decoder 130, a page buffer 140, an input and output (I/O) circuit 150, and a control logic 160.

Referring to FIG. 3, the memory cell array 110 may include a plurality of memory blocks BLK1 to BLKn. The memory blocks BLK1 to BLKn may be respectively connected to the row decoder 130 through a word line WL, a string select line SSL, and a ground select line (GSL), and may be connected to the page buffer 140 through a bit line (BL).

The memory cell array 110 may include a plurality of memory cells disposed in regions in which a plurality of word lines WL cross a plurality of bit lines BL. Respective memory cells may be formed to have a cell type such as a single level cell (SLC), a multi-level cell (MLC), a triple-level cell (TLC), or a quad-level cell (QLC).

A plurality of memory blocks BLK1 to BLKn may be respectively formed to have a 3-dimensional structure on the substrate. For example, a plurality of memory NAND strings NS11 to NS33 included in the respective memory blocks BLK1 to BLKn may be formed in a direction D1 that is perpendicular to the substrate. An upper side of the substrate may be perpendicular to a direction D2 and a direction D3.

Referring to FIG. 4, the first memory block BLK1 may include a plurality of memory NAND strings NS11 to NS33 connected between a plurality of bit lines BL1 to BL3 and a common source line CSL. The memory NAND strings NS11 to NS33 may respectively include a string select transistor SST, a plurality of memory cells MC, and a ground select transistor GST. FIG. 4 shows that there are three bit lines BL1 to BL3, nine memory NAND strings NS11, NS12, NS13, NS21, NS22, NS23, NS31, NS32, and NS33, and the memory NAND strings NS11 to NS33 respectively include eight memory cells MC, and without being limited thereto, their numbers may be changed depending on embodiments.

A gate of the string select transistor SST may be connected to corresponding string select lines SSL1, SSL2, and SSL3. The memory cells MC may be connected to the corresponding word lines WL1, WL2, WL3, WL4, WL5, WL6, WL7, and WL8. The word lines WL1 to WL8 may correspond to gate lines. A gate of the ground select transistor GST may be connected to corresponding ground select lines GSL1, GSL2, and GSL3. The string select transistor SST may be connected to the corresponding bit lines BL1, BL2, and BL3, and the ground select transistor GST may be connected to the common source line CSL.

The word lines (e.g., WL1) with the same heights may be connected in common, and the ground select lines GSL1 to GSL3 and the string select lines SSL1 to SSL3 may be respectively separated in the first memory block BLK1.

Referring to FIG. 2, the memory cell array 110 may include at least a first region 111 and a second region 112. Separation of the first region 111 and the second region 112 is not physical, but may be variable and logical. For example, the memory controller 200 may designate the first memory block BLK1 as the first region 111, and may designate the remaining memory blocks BLK2 to BLKn as the second region 112. However, embodiments are not limited thereto. For example, the memory controller 200 may designate the first memory block BLK1 and the second memory block BLK2 as the first region 111 according to an instruction of the host 10, or if needed, and may designate the remaining memory blocks BLK3 to BLKn as the second region 112 to thus resultantly designate and change the memory blocks belonging to the respective regions.

The memory blocks belonging to the first region 111 may be programmed with the number of bits per cell that is different from the memory blocks belonging to the second region 112. For example, the memory controller 200 may program data to the memory block of the first region 111 according to a single-bit program method, and may program data to the memory block of the second region 112 according to a multi-bit program method. The single-bit program method may include the SLC mode, and the multi-bit program may include the MLC mode, the TLC mode, and the QLC mode. For example, the respective memory cells belonging to the first region 111 may store 1-bit data, and the respective memory cells belonging to the second region 112 may store m-bit data (m is an integer that is equal to or greater than 2).

Setting data CDATA for driving the memory device 100 may be programmed to the first memory block BLK1 of the first region 111. The setting data CDATA may initialize and set the memory device 100 prior to the map open operation for the purpose of the memory operation, and they may be stored when a specific region of the memory cell is tested. The map open operation may load map data (or metadata) programmed before the memory device 100 is turned off and may configure the same with new information. The map data may be programmed to the first region 111. The memory controller 200 may process the request from the host 10 by using the map data. The map data may include logical-to-physical (L2P) map data.

The map open operation may include a read operation. For example, the read operation may be an SLC read. The SLC read may be an operation for reading the data of the memory cell by using one voltage. When a sudden power off (SPO) is generated and power is supplied, the map open operation may further include an erase operation and a program operation. For example, the erase operation may be a SLC erase, and the program operation may be an SLC program. The SLC erase and the SLC program may erase and program the data by using one voltage.

The setting data CDATA of the memory device 100 may be expressed as information data read (IDR) data. The setting data CDATA may include DC information, option information, column repair information, and bad block information trimmed for the respective memory cell arrays 110. The DC information may include setting conditions for operating the peripheral circuit of the memory device 100, and a pump circuit.

There may be replicas used as substitutes for the setting data CDATA when distortions are generated by degradation of the setting data CDATA. The replicas may include a plane replica and/or an SSL replica. For example, the setting data CDATA may be duplicated as a replica and may be programmed to other portions of the first region 111. For example, the setting data CDATA may be programmed to one region of the first memory block BLK1, and the replica may be programmed to another region of the first memory block BLK1. The replica may also be programmed to the second memory block BLK2. The replica may be programmed to a plurality of regions in the second memory block BLK2. For example, there may be a plurality of replicas.

When the memory device 100 is turned on, the memory controller 200 may perform an initialization operation of the memory device 100, and may perform a setting operation of the memory device 100 for operations that are needed by priority by using the setting data CDATA and/or the replicas. For example, the operation that is preferentially needed may be a read operation, particularly an SLC read. The memory controller 200 may perform a setting operation to the general operation of the memory device 100 when the map open operation is completed. The general operation may include memory operations excluding operations needed by priority from among the entire memory operations. For example, when the operation needed by priority is the SLC read, the general operation may include the SLC program, the SLC erase, and the multi-bit-based operation. The multi-bit-based operation may include an MLC read, an MLC program, an MLC erase, a TLC read, a TLC program, a TLC erase, a QLC read, a QLC program, and a QLC erase for reading, programming, and erasing the cell by using a plurality of different voltages.

The setting operation includes a sensing for reading the setting data CDATA of the first region 111 to the page buffer 140, a dump down for verifying validity of the setting data CDATA stored in the page buffer 140 according to a sensing result and storing the same in the latch 162, and subsequent processes for setting conditions for the operation of the memory device 100 based on the setting data CDATA stored in the latch 162. For example, the setting data CDATA stored in the latch 162 are provided to a switch portion, and the switch portion may complete the setting operation by controlling On/Off of respective switches controlling a trim circuit and a repair circuit according to the setting data CDATA.

For example, the subsequent processes may include a WOR-scan for setting DC levels of operating voltages, or removing the buffer of a bad column by using column repair information.

When a fail is generated to the WOR-scan, the memory device 100 may perform a setting operation by using the replica. For example, the memory device 100 may perform a setting operation by using the replica programmed to the replica block and the main SSL when a fail is generated to the setting data CDATA programmed to the main block and the main SSL. When the fail is generated again, the memory device 100 may perform a setting operation by using the replica programmed to the main block and the replica SSL, and when the fail is generated again, the memory device 100 may perform a setting operation by using the replica programmed to the replica block and the replica SSL. However, an order of the setting operation is not limited thereto, and the operation may be performed in other orders.

The setting data and the replica may be programmed in the first memory block BLK1 of the first region 111 of the memory device 100 according to an embodiment as expressed in Table 1.

TABLE 1

| | SSL1 | SSL2 | SSL3 | . . . | SSLk |
|---|---|---|---|---|---|
| WL8 | Normal | | | | Replica |
| WL7 | SLC | | | | Replica |
| WL6 | not-SLC | | | | Replica |
| WL5 | SLC Erase | SLC Program | SLC Read | | Replica |
| WL4 | not-SLC Erase | not-SLC Program | not-SLC Read | | Replica |
| WL3 | PIR | not-PIR | | | Replica |
| WL2 | PIC | not-PIC | | | Replica |
| WL1 | — | — | — | | — |

General setting data may be programmed to the memory cell MC connected to the word line WL8 of the string select line SSL1. The general setting data may include setting data for an SLC erase, an SLC program, an SLC read, an MLC erase, an MLC program, and an MLC read. When the memory cell array 110 supports a cell type of the TLC, the general setting data may further include setting data for a TLC erase, a TLC program, and a TLC read. When the memory cell array 110 supports a cell type of the QLC, the general setting data may further include setting data for a QLC erase, a QLC program, and a QLC read. The MLC operation (MLC erase, MLC program, and MLC read), the TLC operation (TLC erase, TLC program, and TLC read), and the QLC operation (QLC erase, QLC program, and QLC read) may represent operations for erasing, programming, or reading the data of the memory cell by using different voltages.

The setting data for the SLC operation may be programmed to the memory cell MC connected to the word line WL7 of the string select line SSL1. The setting data for the SLC operation may include setting data for an SLC erase, an SLC program, and an SLC read.

Setting data for a non-SLC operation may be programmed to the memory cell MC connected to the word line WL6 of the string select line SSL1. The non-SLC operation may be operations excluding the SLC operation from among the operations of the memory device 100. For example, setting data for the non-SLC operation may include setting data including at least one of the MLC erase, the MLC program, the MLC read, the TLC erase, the TLC program, the TLC read, the QLC erase, the QLC program, and the QLC read.

Setting data for the SLC erase operation may be programmed to the memory cell MC connected to the word line WL5 of the string select line SSL1.

Setting data for the SLC program operation may be programmed to the memory cell MC connected to the word line WL5 of the string select line SSL2.

Setting data for the SLC read operation may be programmed to the memory cell MC connected to the word line WL5 of the string select line SSL3.

Setting data for the non-SLC erase operation may be programmed to the memory cell MC connected to the word line WL4 of the string select line SSL1. Setting data for the non-SLC erase operation may include setting data for at least one of the MLC erase, the TLC erase, and the QLC erase.

Setting data for the non-SLC program operation may be programmed to the memory cell MC connected to the word line WL4 of the string select line SSL2. Setting data for the non-SLC program operation may include setting data for at least one of the MLC program, the TLC program, and the QLC program.

Setting data for the non-SLC read operation may be programmed to the memory cell MC connected to the word line WL4 of the string select line SSL3. Setting data for the non-SLC read operation may include setting data including at least one of the MLC read, the TLC read, and the QLC read.

Setting data for a plane independent read (PIR) operation may be programmed to the memory cell MC connected to the word line WL3 of the string select line SSL1. The PIR operation may signify that, when one plane is in a busy state, the memory device 100 including a plurality of planes may perform a read operation on other planes.

Setting data for the non-PIR operation may be programmed to the memory cell MC connected to the word line WL3 of the string select line SSL2.

Setting data for a plane independent core (PIC) operation may be programmed to the memory cell MC connected to the word line WL2 of the string select line SSL1. The PIC operation may signify that, when one plane is in the busy state, the memory device 100 including a plurality of planes may perform read, program, and erase operations on other planes.

Setting data for the non-PIC operation may be programmed to the memory cell MC connected to the word line WL2 of the string select line SSL2.

A replica on the setting data may be programmed to a plurality of memory cells MC connected to the word lines WL2 to WL8 of a string select line SSLk. Here, k may be an integer that is greater than 3. The memory controller 200 may perform a setting operation of the memory device 100 by using the replica when the setting data are degraded.

When the memory device 100 is turned off, the memory device 100 may perform an initialization operation, and may perform a setting operation by reading at least one of the setting data expressed in Table 1. Compared to the performance of a setting operation of the memory device 100 by using general setting data, by performing a setting operation by using some needed setting data, the booting time of the memory system 20 is reduced to decrease the booting time of the computing system 5, and power consumption at the time of the booting may be reduced. For example, the memory device 100 may read the setting data for the SLC operation and may perform the setting operation.

User data may be programmed to the second region 112. However, embodiments are not limited thereto, and the user data may be programmed to the first region 111.

The control logic 160 may control the general operation of the memory device 100, and may output respective control signals relating to the memory operation. For example, the control logic 160 may control the memory device 100 by using an internal control signal based on at least one of the address ADDR, the command CMD, and the control signal CTRL received from the memory controller 200.

The control logic 160 may generate a control signal VCTRL for controlling the voltage generator 120 and a control signal PCTRL for controlling the page buffer 140, and may generate a row address R_ADDR and a column address C_ADDR based on the address ADDR. The control logic 160 may output the row address R_ADDR to the row decoder 130, and may output the column address C_ADDR to the input and output circuit 150.

The voltage generator 120 may receive power PWR, may regulate a voltage Vg for the memory operation according to the control signal VCTRL from the control logic 160, and may provide the voltage Vg to the memory cell array 110 through the row decoder 130.

The row decoder 130 may be connected to the memory cell array 110 through the word line WL, the string select line SSL, and the ground select line GSL. The row decoder 130 may select at least one of the memory blocks BLK1 to BLKn by decoding the row address R_ADDR input from the control logic 160. For example, the row decoder 130 may select the word line WL, the string select line SSL, and the ground select line GSL by using the row address R_ADDR. The row decoder 130 may provide the voltage Vg supplied from the voltage generator 120 to the word line WL.

The page buffer 140 may be connected to the memory cell array 110 through the bit line BL, and may be connected to the input and output circuit 150 through the data line DL. At the time of the program operation, the input and output circuit 150 may receive program data DATA from the memory controller 200, and may provide the program data DATA to the page buffer 140 based on the column address C_ADDR provided by the control logic 160. At the time of the read operation, the input and output circuit 150 may provide the read data DATA stored in the page buffer 140 to the memory controller 200 based on the column address C_ADDR provided by the control logic 160.

The control logic 160 may include a dump down circuit (DDC) 161, a latch 162, and a ROM 163. The dump down circuit 161 may perform a dump down by using the setting data CDATA and/or the replica. For example, the dump down circuit 161 may verify validity of the setting data CDATA and/or the replica of the page buffer 140. The dump down circuit 161 may store the data having passed through the verification of validity into the latch 162. The latch 162 may receive the valid setting data CDATA or the replica from the dump down circuit 161 and may store the same. The latch 162 may be implemented as a volatile memory for storing the data needed by the memory device 100. The latch 162 may include an electrical-fuse (e-fuse). The ROM 163 may store the data to be preserved after the memory device 100 is turned off. FIG. 2 shows that the dump down circuit 161, the latch 162, and the ROM 163 are included in the control logic 160, and without being limited thereto, and at least one of the dump down circuit 161, the latch 162, and the ROM 163 may be implemented as constituent elements that are different from the control logic 160.

Figure 5:
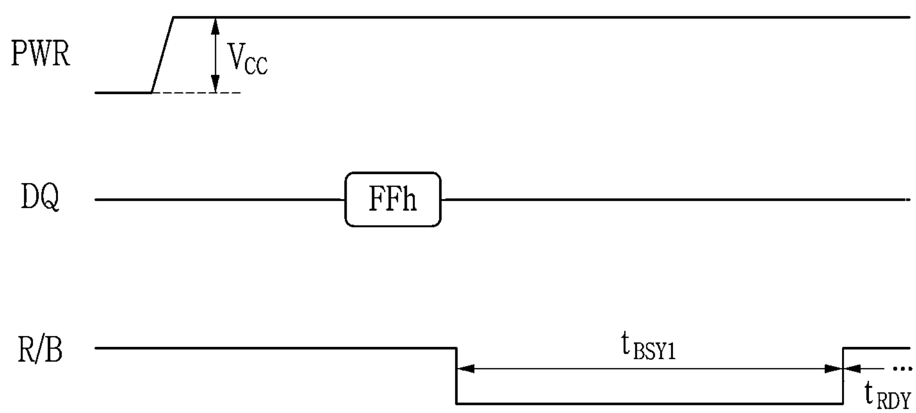
FIG. 5 shows times for initialization and setting a memory device according to an embodiment.

FIG. 5 shows times for initialization and setting a memory device according to an embodiment.

Referring to FIG. 5, the memory controller 200 may apply power PWR to the memory device 100 to turn on the memory device 100. The power PWR may be a voltage $V_{CC}$ for driving the memory device 100. A DQ pad for transmitting signals between the memory device 100 and the memory controller 200 may be installed. An R/B pad for outputting that the memory device 100 is in the busy state (or an active state) or a ready state (or an inactive state) may be output to the memory controller 200.

The memory controller 200 may output a command FFh for instructing the initializing and setting operation to the memory device 100 through the DQ pad. The memory device 100 may be in the busy state and may perform the initialization operation and the setting operation for a time period $t_{BSY1}$ in response to the command FFh. For example, the memory device 100 may perform the initialization operation, and may read the setting data CDATA of the first region 111 to perform the setting operation. In this instance, the setting data CDATA are general setting data, and may include setting data for at least one of the SLC erase, the SLC program, the SLC read, the MLC erase, the MLC program, the MLC read, the TLC erase, the TLC program, the TLC read, the QLC erase, the QLC program, and the QLC read.

When the setting data CDATA of the first region 111 are degraded, the memory device 100 may read the replica of the first region 111 and may perform the setting operation. When the initializing and setting operation ends, the memory device 100 may be in the ready state at the time period $t_{RDY}$. The memory controller 200 may determine whether the memory device 100 is in the busy state or the ready state based on the signal of the R/B pad. For example, when the signal of the R/B pad has a high logic value, the memory controller 200 may determine the memory device 100 to be in the ready state, and when the signal of the R/B pad has a low logic value, the memory controller 200 may determine the memory device 100 to be in the busy state.

Figure 6:
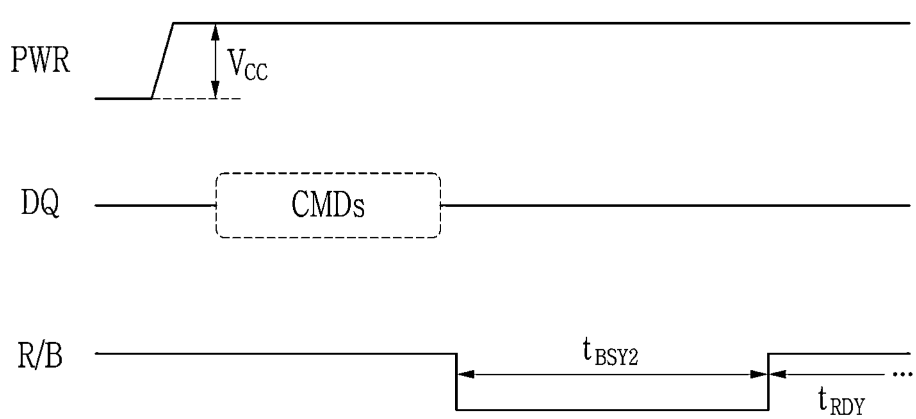
FIG. 6 shows initialization and setting times of a memory device according to an embodiment.
Figure 7A:
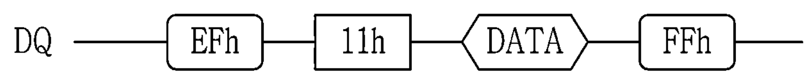
FIGS. 7A, 7B, and 7C show an example of a command sequence according to an embodiment.
Figure 7B:
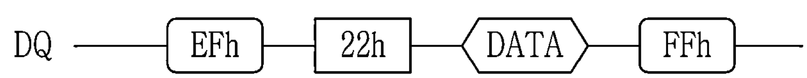
Figure 7C:
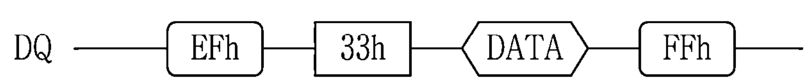
Figure 8A:
FIGS. 8A, 8B, and 8C show another example of a command sequence according to an embodiment.
Figure 8B:
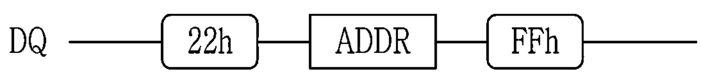
Figure 8C:
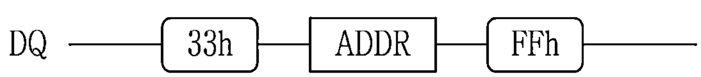

FIG. 6 shows initialization and setting times of a memory device according to an embodiment, FIGS. 7A to 7C show an example of a command sequence according to an embodiment, and FIGS. 8A to 8C show another example of a command sequence according to an embodiment.

Referring to FIG. 6, the memory controller 200 may apply power PWR to the memory device 100 and may turn on the memory device 100. The power PWR may be the voltage $V_{CC}$ for driving the memory device 100.

The memory controller 200 may output the command sequence CMDs for instructing the initializing and setting operation to the memory device 100 through the DQ pad. The memory controller 200 may perform different setting operations after performing the initialization operation on the memory device 100 by using different command sequences CMDs.

The memory device 100 may be in the busy state for the time period $t_{BSY2}$ and may perform the initializing and setting operation in response to the command sequence CMDs. For example, the memory device 100 may perform the initialization operation and may read the setting data CDATA of the first region 111 to thus perform the setting operation. In this instance, the setting data CDATA may include part of the general setting data. For example, the setting data CDATA may include at least one of setting data for the SLC operation, setting data for the non-SLC operation, setting data for the SLC erase operation, setting data for the SLC program operation, setting data for the SLC read operation, setting data for the non-SLC erase operation, setting data for the non-SLC program operation, setting data for the non-SLC read operation, setting data for the PIR operation, setting data for the non-PIR operation, setting data for the PIC operation, and setting data for the non-PIC operation. The time period $t_{BSY2}$ may be less than the time period $t_{BSY1}$ of FIG. 5. For example, the memory device 100 may perform the setting operation on the operation needed after the initialization operation to thus reduce the booting time of the computing system 5 and reduce power consumption at the time of the boosting. The memory device 100 may perform the setting operation on the remaining operation after the map open operation is completed.

When the setting data CDATA of the first region 111 are degraded, the memory device 100 may read the replica of the first region 111 and may perform the initializing and setting operation. The memory device 100 may be in the ready state for the time period $t_{RDY}$ when the initializing and setting operation ends. The memory controller 200 may determine whether the memory device 100 is in the busy state or the ready state based on the signal of the R/B pad. For example, when the signal of the has a high logic value, the memory controller 200 may determine the memory device 100 to be in the ready state, and when the signal of the R/B pad has a low logic value, the memory controller 200 may determine the memory device 100 to be in the busy state.

Referring to FIGS. 7A to 7C, a set-feature-type command sequence CMDs for different initializing and setting operations may be found. Referring to FIG. 7A, the command sequence CMDs is for an IDR_A, and may include a command EFh, an address 11*h*, data DATA, and a command FFh. Referring to FIG. 7B, the command sequence CMDs is for an IDR_B, and may include a command EFh, an address 22*h*, data DATA, and a command FFh. Referring to FIG. 7C, the command sequence CMDs is formed of an IDR_C, and may include a command EFh, an address 33*h*, data DATA, and a command FFh. Referring to FIGS. 7A to 7C, the command EFh may precede the command FFh. The addresses 11*h* to 33*h* may distinguish the setting operations. For example, the IDR_A may be given for the read operation, the IDR_B may be given for the program operation, and the IDR_C may be given for the erase operation. In an embodiment, the read operation may be the SLC read, the program operation may be the SLC program, and the erase operation may be the SLC erase, but embodiments are not limited thereto. The data DATA may be a signal for designating a start to end range of the latch 162. For example, the data DATA may be a 4-byte signal. The command FFh may be a signal for triggering the setting operation.

Referring to FIGS. 8A to 80, a general command type command sequence CMDs for differently initializing and setting operations may be found. Referring to FIG. 8A, the command sequence CMDs is for the IDR_A, and may include a command 11*h*, an address ADDR, and a command FFh. Referring to FIG. 8B, the command sequence CMDs is for the IDR_B, and may include a command 22*h*, an address ADDR, and a command FFh. Referring to FIG. 8C, the command sequence CMDs is for the IDR_C, and may include a command 33*h*, an address ADDR, and a command FFh. Referring to FIGS. 8A to 8C, the commands 11*h* to 33*h* may distinguish the setting operations. For example, the IDR_A may be for the read operation, the IDR_B may be for the program operation, and the IDR_C may be for the erase operation. In an embodiment, the read operation may be the SLC read, the program operation may be the SLC program, and the erase operation may be the SLC erase, but embodiments are not limited thereto. The address ADDR may be a signal for designating a start to end range of the latch 162. For example, the data DATA may be a 4-byte signal. The command FFh may be a signal for triggering the setting operation.

Figure 9:
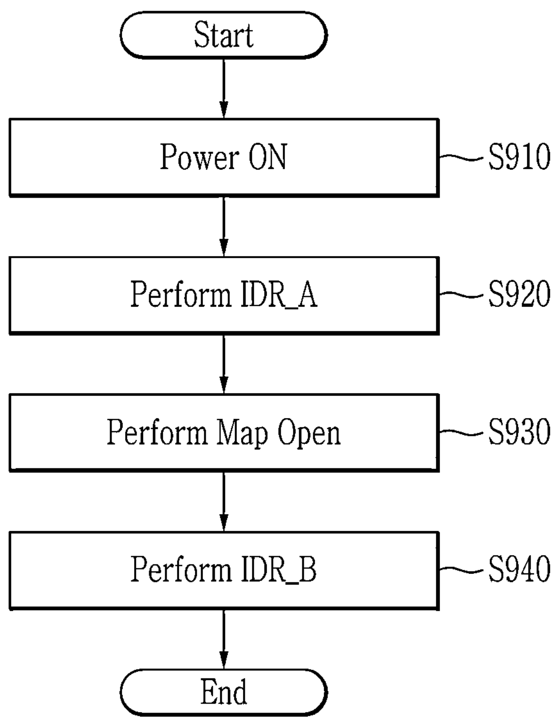
FIG. 9 shows a flowchart on an initializing and setting operation of a memory device according to an embodiment.

FIG. 9 shows a flowchart on an initializing and setting operation of a memory device according to an embodiment.

Referring to FIG. 9, the memory controller 200 may turn on the memory device 100 (S910). The memory device 100 may be turned off before S910. The turned-off memory device 100 may need the initializing and setting operation.

The memory device 100 may perform the initialization operation and setting operation IDR_A in response to the command from the memory controller 200 (S920). The setting operation IDR_A may be performed for the operation needed to the memory device 100. For example, the operations needed by the memory device 100 may have priorities as expressed in Table 2.

TABLE 2

| Priority | Operation | | |
|---|---|---|---|
| 1 | SLC Read | | |
| 2 | SLC Program/Erase | | |
| 3 | MLC Read/ Program/Erase | TLC Read/ Program/Erase | QLC Read/ Program/Erase |
| . . . | | | |

The memory device 100 according to an embodiment may need the SLC read. The setting operation IDR_A may include sensing for reading the setting data CDATA for the SLC read from the first region 111 and storing the same in the page buffer 140, a dump down for the dump down circuit 161 to perform a majority voter method to the setting data CDATA stored in the page buffer 140 and store the same in the latch 162 when the majority voter result is found as pass, and a WOR-scan for excluding buffers of bad column by using column repair information. The majority voter method may be performed by a majority voter circuit included by the dump down circuit 161.

The majority voter circuit may duplicate and expand respective bits of the setting data CDATA by n (n is an integer that is greater than 1) bits and may program results to the first region 111. For example, in the case of n=8, the majority voter circuit may duplicate and expand the respective bits '0' of the setting data CDATA into '00000000', and may duplicate and expand the respective bits '1' of the setting data CDATA into '11111111'. When the setting data CDATA stored in the page buffer 140 match bits of equal to or greater than a reference number from among 8 bits, the majority voter circuit may determine the respective bits of the setting data CDATA to be valid and may program to the latch 162, and when the setting data CDATA match bits of less than the reference number from among 8 bits, the majority voter circuit may determine the respective bits thereof to be invalid and may not program thereto. In an embodiment, the reference number may be 0.75*n. However, embodiments are not limited thereto, and the bits may be duplicated and expanded to a plurality of bits such as 16 bits or 32 bits, they may be determined whether to match the bits of equal to or greater than the reference number, and the majority voter method may then be performed.

The memory device 100 according to an embodiment may need a defensive code with the SLC read. When an uncorrectable error correction code (UECC) is generated at the time of the read operation, the memory device 100 may use the defensive code to read the data. For example, when the read operation is abnormally performed because of degradation, the defensive code may check dispersion of the memory cell to check actual read levels and vary read offsets.

The memory device 100 may perform a map open in response to the command from the memory controller 200 (S930). The map open may include operations such as a root open, a directory open, and an archive open. In this case, the memory device 100 may perform the read operation on the corresponding data of the first region 111. The read operation may be the SLC read, and without being limited thereto, and it may be realized into the MLC read, the TLC read, or the QLC read. The memory device 100 may further perform a prescan for applying dummy pulses to the respective memory block through the SLC read operation. The prescan may perform a data transfer (tR) without data out (Dout).

The memory device 100 may perform a setting operation IDR_B in response to the command from the memory controller 200 (S940). The setting operation IDR_B may be performed to subsequent operations with lower priorities of the memory device 100. For example, when the setting operation IDR_A on the SLC read is performed at S920, the setting operation IDR_B on the SLC erase, the SLC program, the MLC operation, the TLC operation, and the QLC operation may be performed at S940. The S940 may be performed in the background of the memory device 100.

The memory device 100 may shorten the booting time of the computing system 5 and may reduce power consumption at the time of booting by performing the setting operation IDR_A on the operation needed before the map opens.

According to embodiments, the setting operation IDR_A is exemplified to be for the SLC read, and without being limited thereto, it may be for at least one of the SLC program, the SLC erase, the MLC operation, the TLC operation, the QLC operation, the PIR operation, the non-PIR operation, the PIC operation, or the non-PIC operation. When the setting operation IDR_A is for the non-PIR operation, the setting operation IDR_B may be for the PIR operation. When the setting operation IDR_A is for the non-PIC operation, the setting operation IDR_B may be for the PIC operation.

Figure 10:
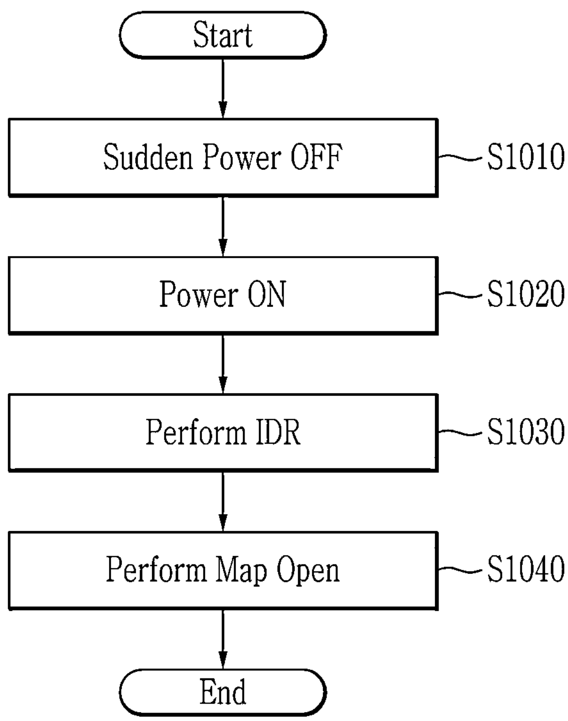
FIG. 10 shows a flowchart on an initializing and setting operation of a memory device according to an embodiment.

FIG. 10 shows a flowchart on an initializing and setting operation of a memory device according to an embodiment.

Referring to FIG. 10, a sudden power off (SPO) may be generated to the memory device 100 because of unexpected conditions (S1010).

The memory controller 200 may turn on the memory device 100 (S1020). The turned-on memory device 100 may need the initializing and setting operation.

The memory device 100 may perform the initialization operation and the setting operation IDR in response to the command from the memory controller 200 (S1030). The setting operation IDR sets values that are needed before the memory device 100 is operated, and it may include sensing for reading the setting data CDATA from the first region 111 and storing the same in the page buffer 140, a dump down for the dump down circuit 161 to perform a majority voter method to the setting data CDATA stored in the page buffer 140 and store to the latch 162 when the majority voter result is found as pass, and a WOR-scan for excluding the buffer of the bad column by using column repair information. The majority voter method may be performed by the majority voter circuit of the dump down circuit 161.

The majority voter circuit may duplicate and expand the respective bits of the setting data CDATA by 8 bits and may program results to the first region 111. For example, the majority voter circuit may duplicate and expand the respective bits '0' of the setting data CDATA into '00000000', and may duplicate and expand the respective bits '1' of the setting data CDATA into '11111111'. When the setting data CDATA stored in the page buffer 140 match bits of equal to or greater than a reference number from among 8 bits, the majority voter circuit may determine the respective bits of the setting data CDATA to be valid and may program to the latch 162, and when the setting data CDATA match bits of less than the reference number from among 8 bits, the majority voter circuit may determine the respective bits thereof to be invalid and may not program thereto. The reference number may be 6. When a sudden power off (SPO) is generated, the memory device 100 may perform read, program, and erase operations in the map open process, so the memory device 100 may read the setting data CDATA needed for the read, program, and erase operations from the first region 111. The read, program, and erase operations may be the SLC read, the SLC program, and the SLC erase, and without being limited thereto, the memory device 100 may perform respective operations for various bits per cell such as the MLC, the TLC, or the QLC. According to embodiments, the majority voter circuit is not limited to duplicate and expand the respective bits of the setting data CDATA to 8 bits, but may be duplicated and expanded to a plurality of bits and perform the majority voter method.

The memory device 100 may perform the map open in response to the command from the memory controller 200 (S1040). The map open may include operations such as root open, directory open, journal replay, and archive open. Regarding the root open, the directory open, and the archive open, the memory device 100 may perform the read operation on the corresponding data of the first region 111. Regarding the journal replay, the memory device 100 may perform the read, program, and erase operations relating to power loss protection (PLP) data of the first region 111. The read, program, and erase operations may be the SLC read, the SLC program, and the SLC erase, and without being limited thereto, they may be performed with various bits per cell such as the MLC, the TLC, or the QLC.

Figure 11:
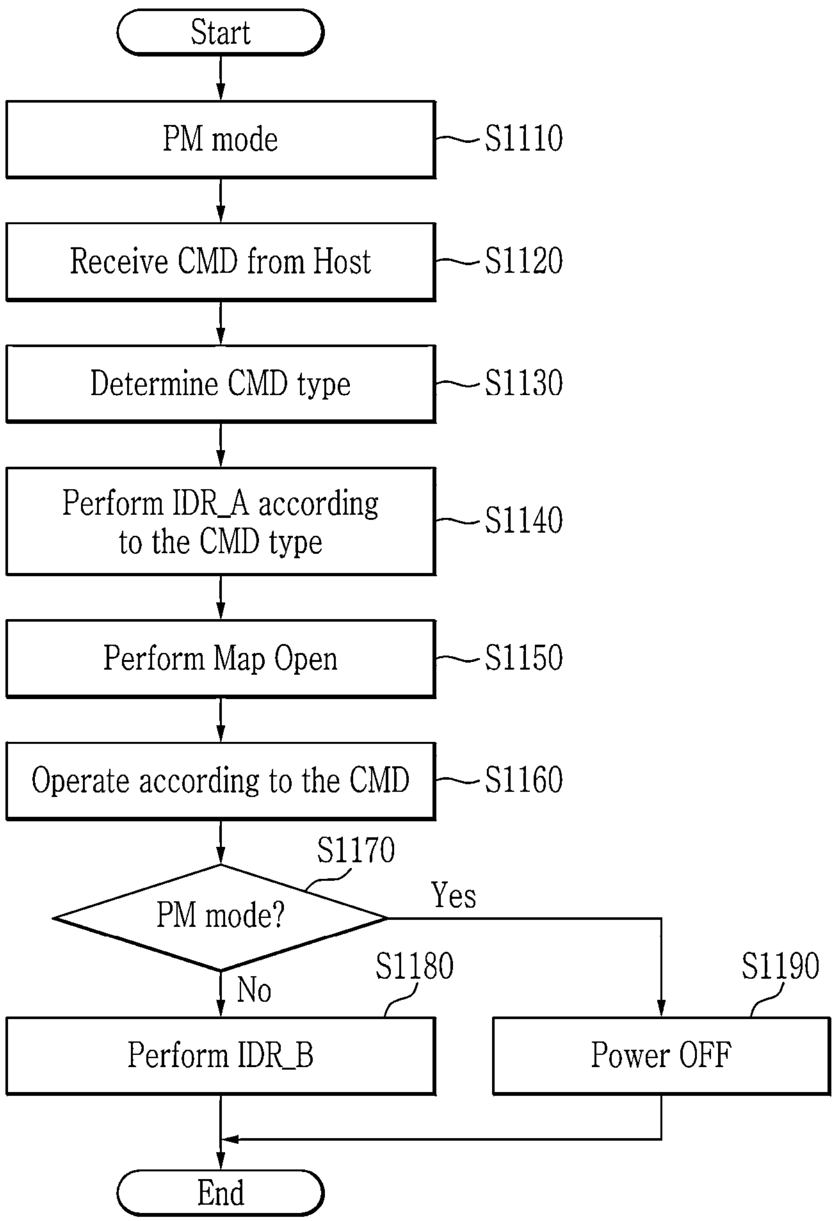
FIG. 11 shows a flowchart on an initializing and setting operation of a memory device according to an embodiment.

FIG. 11 shows a flowchart on an initializing and setting operation of a memory device according to an embodiment.

Referring to FIG. 11, in the computing system 5, the host 10 may manage the memory system 20 with a power management (PM) mode (S1110). In the PM mode, the memory controller 200 may be turned on, and the memory device 100 may be turned off.

In the PM mode, the memory system 20 may receive a command CMD from the host 10 (S1120). The command CMD may be multiple in a command queue. The memory controller 200 may turn on the memory device 100 in response to the receiving of the command CMD from the host 10. The turned-off memory device 100 may need the initializing and setting operation.

The memory controller 200 may determine the command (CMD) type (S1130). For example, the memory controller 200 may determine the command type in the command queue. The command type may include the SLC read, the SLC program, the SLC erase, the MLC read, the MLC program, the MLC erase, the TLC read, the TLC program, the TLC erase, the QLC read, the QLC program, and the QLC erase. The memory controller 200 may instruct the memory device 100 to perform the setting operation IDR_A according to the command type.

The memory device 100 may perform the setting operation IDR_A in response to the instruction from the memory controller 200 (S1140). The setting operation IDR_A may perform the operation needed for performing the command CMD.

For example, the host 10 may output the command CMD including the SLC read to the memory system 20. The memory controller 200 may instruct the memory device 100 to perform the setting operation IDR_A for the SLC read. The memory device 100 may sense the setting data CDATA for the SLC read in the first region 111 and may program to the page buffer 140, and may apply a majority voter method to the data programmed to the page buffer 140, and may dump down the passed data to the latch 162. The memory device 100 may further perform the WOR-scan for excluding the bad buffer by using column repair information.

As another example, the host 10 may output the command CMD including the TLC program to the memory system 20. The memory controller 200 instruct the memory device 100 to perform the setting operation IDR_A for the TLC program. The memory device 100 may sense the setting data CDATA for the TLC program in the first region 111 and may program to the page buffer 140. The setting data CDATA for the TLC program may include the setting data for the TLC program and/or the setting data for the SLC read. The setting data for the SLC read may need sensing for the map open operation. The memory device 100 may perform the majority voter method to the data programmed to the page buffer 140, and may dump down the passed data to the latch 162. The memory device 100 may further perform the WOR-scan for excluding the buffer by using column repair information. The SLC read and the TLC program are exemplified for better understanding and ease of description, but embodiments are not limited thereto, and the memory device 100 may perform the setting operation IDR_A to other operations.

The memory device 100 may perform the map open in response to the instruction from the memory controller 200 (S1150). The map open may include operations such as root open, directory open, or archive open. In this case, the memory device 100 may perform the read operation on the corresponding data of the first region 111. The read operation may be the SLC read, and without being limited thereto, it may be realized into the MLC read, the TLC read, or the QLC read.

When the map open is completed, the memory controller 200 may be operated according to the command CMD (S1160). For example, when the command CMD is the SLC read, the memory controller 200 may perform the SLC read on the memory device 100. When the command CMD is the TLC program, the memory controller 200 may perform the TLC program on the memory device 100.

The memory controller 200 may determine whether a command CMD for instructing to enter the PM mode is input from the host 10 (S1170).

When the command CMD for instructing to enter the PM mode is input from the host 10, the memory device 100 may perform the setting operation IDR_B (S1180). The setting operation IDR_B may be performed to the setting data CDATA that are not sensed and dumped down in the setting operation IDR_A of S1140. For example, when the setting operation IDR_A on the SLC read is performed at S1140, the setting operation IDR_B on the SLC erase, the SLC program, the MLC operation, the TLC operation, and the QLC operation may be performed at S1180. The S1180 may be performed in the background of the memory device 100.

When the command CMD for instructing to enter the PM mode is input from the host 10, the memory controller 200 may turn off the memory device 100 (S1190). The S1120 may be performed according to the command CMD of the host.

Figure 12:
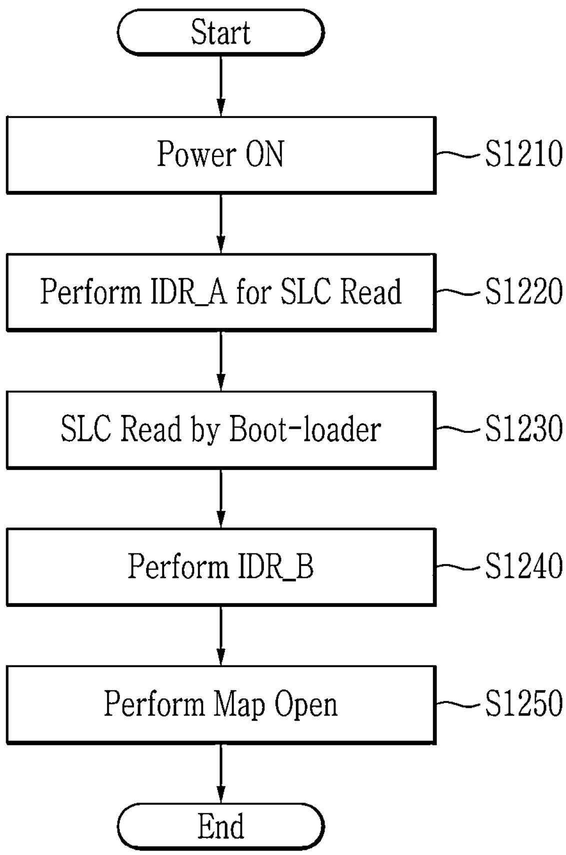
FIG. 12 shows a flowchart on an initializing and setting operation of a memory device according to an embodiment.

FIG. 12 shows a flowchart on an initializing and setting operation of a memory device according to an embodiment.

Referring to FIG. 12, the memory controller 200 may turn on the memory device 100 (S1210). The memory device 100 may be turned off before S1210. The turned-off memory device 100 may need the initializing and setting operation.

The memory device 100 may perform the setting operation IDR_A for the initialization operation and the SLC read in response to the command from the memory controller 200 (S1220). In this instance, the setting operation IDR_A may be performed to the chip to which the main firmware code is programmed. The setting operation IDR_A for the SLC read may include a sensing for reading the setting data CDATA needed for the SLC read from the first region 111 and storing the same in the page buffer 140, a dump down for the dump down circuit 161 to perform a majority voter method to the setting data CDATA stored in the page buffer 140 and store the same in the latch 162 when the majority voter result is found as pass, and a WOR-scan for excluding buffers of bad column by using column repair information. The majority voter method may be performed by a majority voter circuit of the dump down circuit 161.

The majority voter circuit may duplicate and expand the respective bits of the setting data CDATA by 8 bits and may program results to the first region 111. For example, the majority voter circuit may duplicate and expand the respective bits '0' of the setting data CDATA into '00000000', and may duplicate and expand the respective bits '1' of the setting data CDATA into '11111111'. When the setting data CDATA stored in the page buffer 140 match bits of equal to or greater than a reference number from among 8 bits, the majority voter circuit may determine the respective bits of the setting data CDATA to be valid and may program to the latch 162, and when the setting data CDATA match bits of less than the reference number from among 8 bits, the majority voter circuit may determine the respective bits thereof to be invalid and may not program thereto. The reference number may be 6. According to embodiments, the majority voter circuit is not limited to duplicate and expand the respective bits of the setting data CDATA to 8 bits, but it may be realized to be duplicated and expanded to a plurality of bits and perform the majority voter method.

When the setting operation IDR_A is completed, a ROM code programmed to the ROM 163 may be performed to SLC-read a boot loader code programmed to the first region 111. The boot loader is then performed to SLC-read the main firmware code programmed to a specific channel of the memory cell array 110 and a specific way (S1230).

When the main firmware code is read and the main firmware is performed, the setting operation IDR_B may be performed (S1240). The setting operation IDR_B may be performed for the entire chips. The setting operation IDR_B may be an operation for sensing general setting data and dumping down, or sensing setting data on the operation needed by priority and dumping down.

The memory device 100 may perform the map open in response to the command from the memory controller 200 (S1250). The map open may include operations such as root open, directory open, or archive open. In this case, the memory device 100 may perform the read operation on the corresponding data of the first region 111. The read operation may be the SLC read, and without being limited thereto, it may be realized into the MLC read, the TLC read, or the QLC read.

When the setting data are sensed for the operation needed by priority and dumped down in the setting operation IDR_B of S1240, the memory device 100 may perform the setting operation on the remaining operations after S1250. In this case, the setting operation on the other operations may be performed in the background of the memory device 100. Hence, the booting time of the computing system 5 may be reduced, and power consumption at the time of the booting may be reduced.

Figure 13:
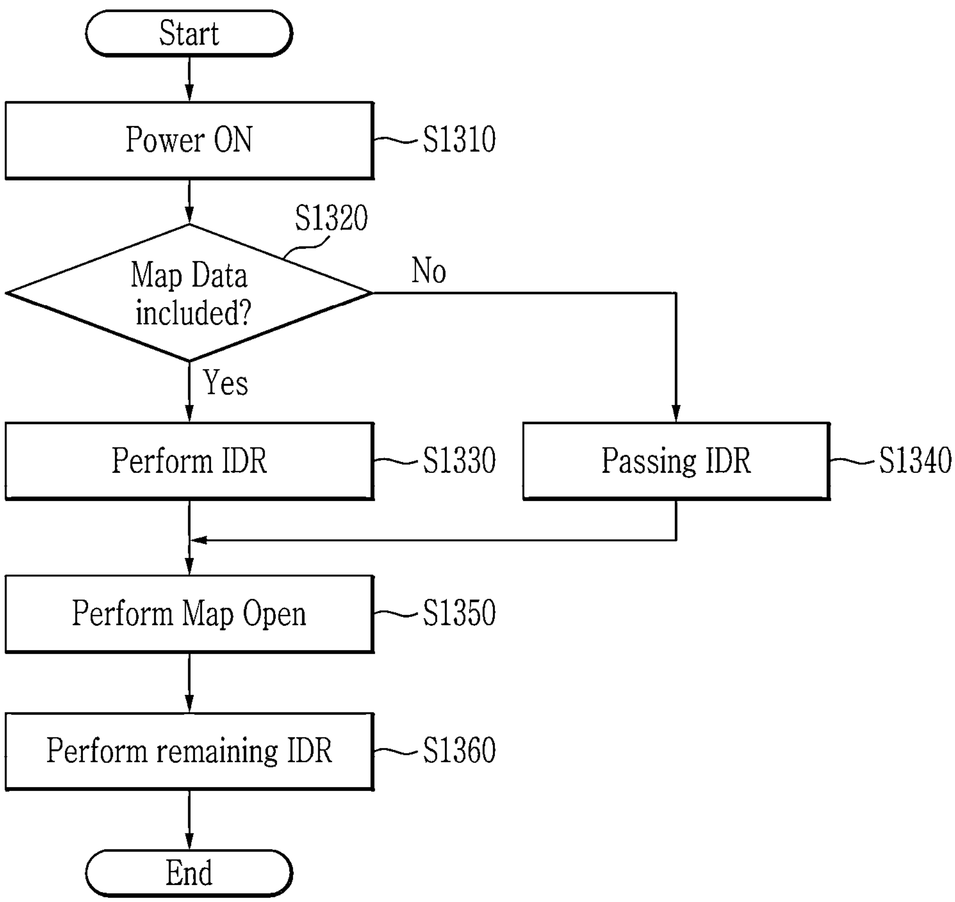
FIG. 13 shows a flowchart on an initializing and setting operation of a memory device according to an embodiment.

FIG. 13 shows a flowchart on an initializing and setting operation of a memory device according to an embodiment.

Referring to FIG. 13, the memory device 100 according to an embodiment may be a high-capacity memory device in which at least two dies are disposed in one way. For example, as expressed in Table 3, the memory device 100 includes four dies Die0 to Die3 in the way Way0, and all the dies Die0 to Die3 may not include the map data. The die Die0 and the die Die1 may include the map data, and the die Die2 and the die Die3 may not include the map data.

TABLE 3

| | NAND | Map Data included? |
|---|---|---|
| Way0 | Die0 | Yes |
| | Die1 | Yes |
| | Die2 | No |
| | Die3 | No |

The memory controller 200 may turn on the memory device 100 (S1310). The memory device 100 may be turned off before S1310. The turned-off memory device 100 may need the initializing and setting operation.

The memory controller 200 may determine whether the dies Die0 to Die3 of the memory device 100 include the map data (S1320). The map data may drive firmware of the memory device 100. For example, the memory controller 200 may determine that the die Die0 and the die Die1 include the map data, and the die Die2 and die Die3 do not include the map data.

The memory controller 200 may instruct the memory device 100 to perform the setting operation IDR on the die Die0 and the die Die1 of the memory device 100, and the die Die0 and the die Die1 of the memory device 100 may perform the setting operation IDR (S1330). In this instance, the setting operation IDR may be performed for the operation needed by priority by the memory device 100, or the setting operation IDR may be performed for the general operation of the memory device 100. The content described with reference to FIG. 9 may be applied to the operation needed by priority by the memory device 100.

The die Die2 and the die Die3 of the memory device 100 including no map data may pass through the setting operation IDR (S1340). The die Die2 and the die Die3 may perform the setting operation IDR after the map open.

The die Die0 and the die Die1 of the memory device 100 may perform the map open in response to the command from the memory controller 200 (S1350). The map open may include operations such as root open, directory open, and archive open. In this case, the memory device 100 may perform the read operation on the corresponding data of the first region 111. The read operation may be the SLC read, and without being limited thereto, it may be realized into the read on the memory cell storing a plurality of bits. The read on the memory cell storing a plurality of bits may include MLC read, TLC read, or QLC read.

The memory controller 200 may instruct the memory device 100 to perform the remaining setting operation (remaining IDR) on the dies Die0 to Die3, and the memory device 100 may perform the remaining setting operation (remaining IDR) (S1360). The remaining setting operation (remaining IDR) may be performed in the background of the memory device 100.

For example, when the setting data are sensed and dumped down on the operation, needed by priority, of the die Die0 and the die Die1 in the setting operation IDR of S1330, the memory device 100 may perform the setting operation on the remaining operation of the die Die0 and the die Die1.

The memory controller 200 instructs the memory device 100 to perform a setting operation IDR on the die Die2 and the die Die3 having passed through the setting operation IDR, and the die Die2 and the die Die3 of the memory device 100 may perform the setting operation IDR. Here, the setting operation IDR may be performed for the general operation of the memory device 100.

The setting operation IDR is performed in divided ways depending on whether the memory device 100 includes map data so the booting time of the computing system 5 may be reduced, and power consumption at the time of the booting may be reduced.

The memory device 100 according to another embodiment may have multi-planes on one die and may/may not store map data for respective planes as expressed in Table 4.

TABLE 4

| | Plane | Map Data included? |
|---|---|---|
| NAND Die | Plane0 | Yes |
| | Plane1 | Yes |
| | Plane2 | No |
| | Plane3 | No |

In this instance, in a like way the storing states of the map data are different for the respective dies Die0 to Die3, the S1330 to S1360 may be performed according to whether planes Plane0 to Plane3 include map data.

Figure 14:
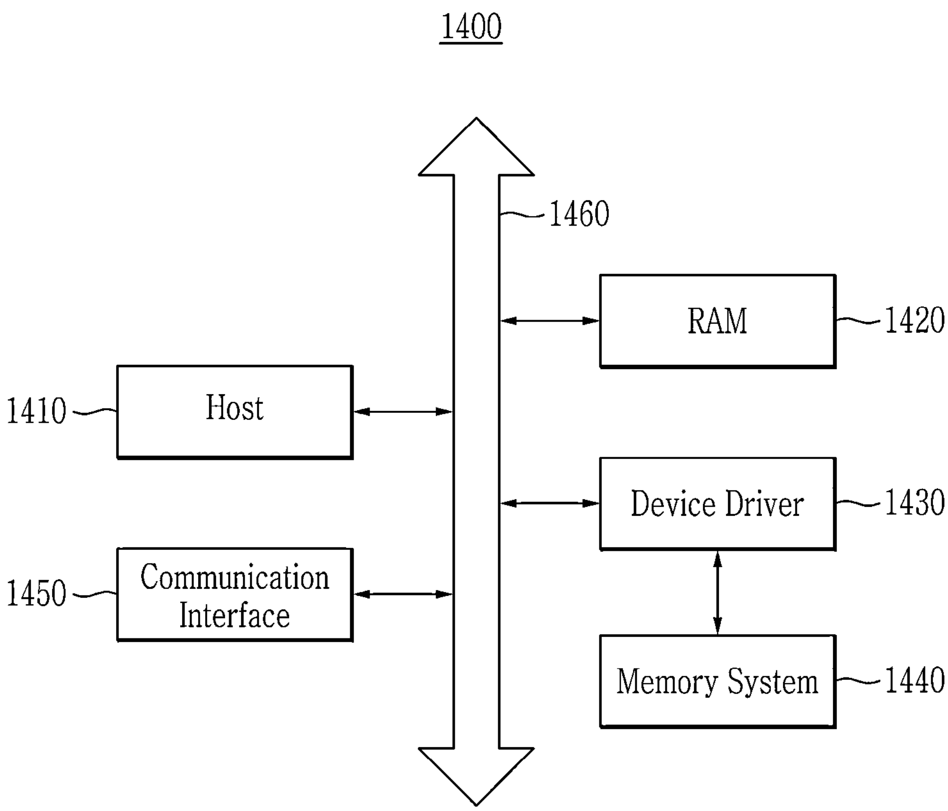
FIG. 14 shows a block diagram on a computing system according to an embodiment.

FIG. 14 shows a block diagram on a computing system according to an embodiment.

The computing system 1400 may be a mobile device or a computer. The computing system 1400 may include a host 1410, a RAM 1420, a device driver 1430, a memory system 1440, a communication interface 1450, and a bus 1460. The host 1410, the RAM 1420, the device driver 1430, the memory system 1440, and the communication interface 1450 may be electrically connected to the bus 1460. The computing system 1400 may further include other general-purpose constituent elements.

The host 1410 may control general operations of respective constituent elements of the computing system 1400. The host 1410 may be a central processing unit (CPU), a graphic processing unit (GPU), a microprocessor, or an application processor (AP).

The RAM 1420 may function as a data memory of the host 1410.

The host 1410 may program data to the memory system 1440 through the device driver 1430 or may read data from the memory system 1440. The data may include setting data and user data. Depending on embodiments, the device driver 1430 may be realized inside the host 1410.

The memory system 1440 may be implemented as a non-volatile memory. The memory system 1440 may include a memory controller and a memory device, and the memory system 1440 may be connected to the device driver 1430. The memory system 1440 may perform a substantially equivalent function to the memory system 20 of FIG. 1.

The bus 1460 provides communication functions among the constituent elements of the computing system 1400. The bus 1360 may include at least one type of bus according to a communication protocol among the constituent elements.

In an embodiment, the respective constituent elements described with reference to FIG. 1 to FIG. 14 or combinations of two or more constituent elements may be implemented as digital circuits, programmable or non-programmable logic devices or arrays, or application specific integrated circuits (ASIC).

While embodiments have been described with reference to the figures, it will be understood by those of ordinary skill in the art that various changes in form and details may be made therein without departing from the spirit and scope as defined by the following claims and their equivalents.

What is claimed is:

1. A memory device comprising:

a memory cell array in which a first setting data on a first operation, a second setting data on a second operation, and map data are stored, the first operation including an SLC read; and a control logic comprising a dump down circuit configured to verify validity of a setting data and a latch in which the setting data having passed through the verification of validity is stored, wherein the first setting data is stored in the latch to perform a first setting operation, and wherein the map data are read after the first setting operation.

2. The memory device of claim 1, wherein the second operation includes a memory operation excluding the SLC read.

3. The memory device of claim 2, wherein the memory operation excluding the SLC read includes a SLC program, a SLC erase, and multi-bit-based read, program, and erase.

4. The memory device of claim 1, wherein the performing of the first setting operation includes reading a defensive code, and wherein the memory device is further configured to read data by using the defensive code based on an uncorrectable error correction code (UECC) being generated at a time of a read operation.

5. The memory device of claim 1, wherein the first operation includes a SLC read operation on a chip to which a main firmware code is programmed, and wherein the memory device, before the reading of the map data, is further configured to:

execute a boot loader by SLC-reading a boot-loader code programmed to a memory cell array; and allow the boot loader to execute the main firmware code.

6. The memory device of claim 5, wherein the executing the boot loader includes:

reading ROM code programmed to a ROM of the memory device to SLC-read the boot-loader code programmed to the memory cell array.

7. The memory device of claim 5, wherein the memory device, after the executing the main firmware code, is further configured to perform a third setting operation on a SLC program and a SLC erase, and wherein the second operation includes a multi-bit-based read, program, and erase.

8. The memory device of claim 1, wherein the memory device, before the performing the first setting operation on the first operation, is further configured to turn on the memory device after a sudden power off (SPO) occurs in the memory device, and wherein the first operation includes SLC read, SLC program, and SLC erase.

9. The memory device of claim 8, wherein the second operation includes multi-bit-based read, program, and erase.

10. The memory device of claim 1, wherein the verifying of validity of the setting data includes:

duplicating and expanding respective bits of the setting data into n bits and programming the n bits of setting data to the memory cell array; and passing through verification of validity based on the setting data matching bits of equal to or greater than a reference number from among the n bits, where n is an integer that is greater than 1.

11. The memory device of claim 10, wherein the reference number is 0.75*n.

12. The memory device of claim 1, wherein the first operation includes a non-plane independent read (non-PIR) operation, and wherein the second operation includes a PIR operation.

13. The memory device of claim 1, wherein the latch includes an electrical-fuse (e-fuse).

14. A memory system comprising:

a memory device comprising a memory cell array in which a first setting data on a first operation, a second setting data on a second operation, and map data are stored and a control logic configured to verify validity of a setting data and store the setting data having passed through the verification of validity in a latch, the first operation including an SLC read; and a memory processor configured to output a first command for the first setting data, a second command for the map data, and a third command for the second setting data, wherein the memory device is configured to store the first setting data in the latch to perform a first setting operation and output a signal for a ready state of the memory device in response to completion of the first setting operation wherein the memory processor is configured to output the second command in response to outputting the signal for the ready state of the memory device.

15. The memory system of claim 14, wherein the second operation includes a memory operation excluding the SLC read.

16. The memory system of claim 15, wherein the memory operation excluding the SLC read includes a SLC program, a SLC erase, and multi-bit-based read, program, and erase.

17. The memory system of claim 15, wherein the second setting data is stored in the latch to perform a second setting operation in background of the memory device.

18. The memory system of claim 14, wherein the memory device is configured to read map data in response to the second command, and wherein the memory system is configured to process a request by using the map data.

19. A memory system comprising:

a memory device comprising a first region in which a first setting data on a first operation and map data are stored and a second region in which a second setting data on a second operation are stored; and is configured to verify validity of a setting data and store the setting data having passed through the verification of validity in a latch, the first operation including an SLC read; and a memory processor configured to perform a first setting operation on a first operation on the first region, read the map data after the first setting operation, and perform a second setting operation on the second region, wherein the first setting data is stored in the latch to perform the first setting operation.

20. The memory system of claim 19, wherein the first region is a die or a plane of the memory device.

* * * * *